United States Patent [19]

Scarborough et al.

[11] Patent Number: 5,780,412

[45] Date of Patent: Jul. 14, 1998

[54] ALKALINE-STABLE HARD SURFACE CLEANING COMPOUNDS COMBINED WITH ALKALI-METAL ORGANOSILICONATES

[75] Inventors: Victoria D. Scarborough; Leonard R. Clark, both of Memphis, Tenn.

[73] Assignee: The Sherwin-Williams Company, Cleveland, Ohio

[21] Appl. No.: 513,077

[22] Filed: Aug. 9, 1995

[51] Int. Cl.⁶ ............ C11D 3/20; C11D 3/395; C11D 1/75; C09K 3/18

[52] U.S. Cl. .......... 510/240; 510/109; 510/238; 510/372; 510/375; 510/380; 510/433; 510/466; 510/503; 106/287.12

[58] Field of Search ............ 510/240, 380, 510/238, 466, 503, 372, 109, 375, 433; 106/287.12

[56] References Cited

U.S. PATENT DOCUMENTS

| | | | |
|---|---|---|---|
| 3,198,747 | 8/1965 | Cook et al. | 252/389 |
| 3,914,476 | 10/1975 | Nitzsche et al. | 427/337 |
| 3,955,985 | 5/1976 | Bosch et al. | 106/2 |
| 4,076,868 | 2/1978 | Roth et al. | 427/348 |
| 4,419,250 | 12/1983 | Allen et al. | 252/8.6 |
| 4,482,471 | 11/1984 | Allen et al. | 252/186.31 |
| 4,783,283 | 11/1988 | Stoddart | 252/547 |
| 4,853,266 | 8/1989 | Cullen | 421/35.7 |
| 5,178,668 | 1/1993 | Traver et al. | 106/2 |
| 5,242,494 | 9/1993 | Callaghan et al. | 106/603 |
| 5,290,470 | 3/1994 | Dutcher | 252/102 |
| 5,356,716 | 10/1994 | Patel | 428/423.1 |
| 5,376,296 | 12/1994 | Dutcher | 252/102 |
| 5,401,432 | 3/1995 | Jourbert et al. | 510/418 |

FOREIGN PATENT DOCUMENTS

| | | |
|---|---|---|
| 2076064 | 10/1995 | Spain |
| 1476027 | 4/1989 | U.S.S.R. |

*Primary Examiner*—Douglas J. McGinty
*Assistant Examiner*—Lorna M. Douyon
*Attorney, Agent, or Firm*—Heidi A. Boehlefeld; Robert E. McDonald; Vivien Y. Tsang

[57] ABSTRACT

A one-step cleaning and water repellent treatment is provided. An alkaline-stable cleaning solution is mixed with an aqueous solution of alkali metal organosiliconates and applied to porous inorganic surfaces as a one-step cleaning and water repellent treatment. The mixture has been found to be stable and compatible. The one-step cleaning and water repellent treatment functions to simultaneously clean and protect porous inorganic surfaces and, thus, reduces the cost and time necessary to clean and protect such a surface.

8 Claims, No Drawings

ALKALINE-STABLE HARD SURFACE CLEANING COMPOUNDS COMBINED WITH ALKALI-METAL ORGANOSILICONATES

BACKGROUND OF THE INVENTION

The present invention combines the cleaning action of alkaline-stable hard surface cleaner formulations with the water repellency imparted by alkali-metal organosiliconates. This combination allows the user to clean and waterproof porous inorganic surfaces in a single application step.

Currently, there are several products available to clean porous inorganic surfaces such as those made of concrete, grout, mortar, brick, stucco, grouted tile, asphaltic roof shingles and other building materials. Typical of one line of cleaning products are those made of an aqueous solution of sodium hypochlorite, surfactants, perfume and stabilizers. Such products, while effective cleaners, generally do not provide any lasting protection from the effects of water to the surface to be cleaned. In particular, they do not provide any water repellant properties.

It is well known that water absorbed into porous surfaces such as patios and grouted bathroom tiles can, under certain situations, result in an undesirable build-up of mold and mildew. In some cases such buildup can cause discoloration that can be hard to remove with conventional cleaners. It is also known that such water damage is less severe on nonporous surfaces. Such difference is believed to be due to the penetration of water into porous surfaces. Also, the penetration of water into porous surfaces can also cause (1) so-called "wash-out" damage to porous surfaces resulting from the repeated penetration and subsequent removal of water from the surface along with particulate matter and (2) cracking of porous surfaces resulting from the freezing and subsequent expansion of penetrated water into a porous surface.

In order to achieve lasting protection from the adverse effects of water on porous inorganic surfaces, a water repellent treatment can be applied in an additional step after cleaning. For example, U.S. Pat. No. 3,914,476 describes a water repellent treatment consisting of an aqueous solution of an alkali metal organosiliconate. However, the use of such solutions and the like are inconvenient to the consumer. They require the separate purchase and application of a second water-repellent product to the surface to be treated after cleaning.

Moreover, although some products are advertised in the marketplace as so-called one-step cleaners and waterproof products, these products are (1) directed toward organic nonporous surfaces and/or (2) are not typically true water repellent but water resistant products. For example, S. C. Johnson & Sons, Inc., markets a product called Bathroom Duck® Multi-Surface Bathroom Cleaner. It is advertised as being effective on "nonporous" surfaces such as "porcelain, fiberglass, tile, formica, vinyl, plastic, stainless steel and synthetic marble." In light of the above, it would be desirable to be able to provide a one-step cleaner and water repellent for porous inorganic surfaces such as concrete patios and grouted tile.

It would also be desirable to be able to provide a quick and convenient one-step cleaner and water repellent for use in cleaning and treating such surfaces to resist the adverse effects of water damage and retard the reappearance of discoloration.

SUMMARY OF THE INVENTION

It is an object of this invention to provide a cleaner and water repellent for porous inorganic surfaces such as concrete patios and grouted tile that is applied in a single step.

It is also an object of this invention to provide a quick and convenient one-step cleaner and water repellent for use in cleaning and treating porous inorganic surfaces to resist the adverse effects of water damage and the reappearance of discoloration.

In accordance with the present invention there is provided a one-step cleaner and water repellent for use in cleaning and treating a porous inorganic surface to resist the adverse effects of water damage. The one-step cleaner and water repellent includes: a mixture of an alkaline-stable cleaning solution and an aqueous solution of an alkali metal organosiliconate. The present invention also includes a method for imparting water repellency to porous inorganic surfaces by cleaning the surface with a mixture of an alkaline-stable cleaning solution and an aqueous solution of alkali metal organosiliconates.

DETAILED DESCRIPTION OF THE INVENTION

The one-step cleaner and water repellent of the present invention is comprised of a mixture of (1) an alkaline-stable cleaning solution and (2) a water-soluble alkali metal organosiliconate. In accordance with the preferred embodiment of the present invention, the alkaline-stable cleaning solution is an aqueous solution of a cleaning agent, a surfactant, a stabilizer and, if desired, a fragrance. Preferably, the alkali metal organosiliconate is prepared in an aqueous solution and mixed with a compatible alkaline-stable cleaning solution just prior to application.

The water-soluble alkali metal organosiliconate of the present invention has the general structure shown below:

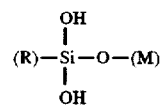

where M is an alkali metal imparting water-solubility to the organosiliconate and R corresponds to a monovalent organic Si—C bonded radical, preferably a monovalent aliphatic hydrocarbon radical, such as a methyl, ethyl or propyl radical. Preferred alkali metals (M) are sodium and potassium. Examples of preferred commercially available alkali-metal siliconates are sodium methyl siliconates (from, for example, Dow Corning of Midland, MI; GE Silicones of Waterford, N.Y.; and OSi Specialties of Norcross, Ga.), potassium methyl siliconate (from, for example, Dow Corning; Rhone-Poulenc of Marietta, Ga; and Wacker Silicones Corp. of Adrian, Mich.) and potassium propyl siliconate (from, for example, Wacker). The latter is generally known to have the best hydrophobicity and chemical resistance because of the increased length of the hydrocarbon chain.

The alkaline-stable cleaning solution is preferably a solution or microemulsion of a cleaning mixture that is compatible with the alkali-metal organosiliconate chosen and having a stabilized pH in the range from about 8 to about 14 and, preferably, in the range from about 10 to about 12. Preferred cleaning agents include chlorine and oxygen bleaches like sodium or calcium hypochlorite, sodium percarbonate, or potassium peroxymonosulfate. Most preferable is sodium hypochlorite.

In addition to a compatible cleaning agent, a wide range of other ingredients can be included in the cleaning solution such as surfactants, stabilizers, fragrances and preservatives. Preferred surfactants include alkaline-stable anionic and nonionic surfactants and/or mixtures thereof. Most preferred are sodium hypochlorite-stable surfactants. The anionic surfactants include, but are not limited to, carboxylic salts like sodium and potassium salts and amine salts of straight-chain fatty acids such as coconut oil and tall oil; sulfonic acid salts like linear alkylbenzenesulfonates, ligninsulfonates, petroleum sulfonates, alpha-olefin sulfonates, alkyltaurates, sulfosuccinate esters and alkylnaphthalenesulfonates; sulfuric acid ester salts like sulfated linear primary alcohols and sulfated polyoxyethylenated straight-chain alcohols; phosphoric and polyphosphoric acid esters like sodium alkyl phosphates and phosphated polyoxyethylenated long-chain alcohols and phenols. The nonionic surfactants include, but are not limited to, polyoxyethylenated alkylphenols and alkylphenol ethoxylates; polyoxyethylenated straight-chain alcohols, polyoxyethylenated polyoxypropylene glycols; long-chain carboxylic acid esters such as glyceryl and polyglyceryl esters of natural fatty acids, propylene glycol, sorbitol and polyoxyethylenated sorbitol esters, polyoxyethylene glycol esters and polyoxyethlenated fatty acids; alkanolamine condensates and alkanolamides such as alkanolamine fatty acid condensates; and acetylenic glycols. Most preferred for use with sodium hypochlorite is lauryl dimethyl amine.

Preferred pH stabilizers include sodium hydroxide, potassium hydroxide, sodium silicate or sodium metasilicate. Most preferred for use with sodium hypochlorite is sodium hydroxide.

The amount of alkali metal organosiliconate present in the aqueous solution (prior to mixture with the cleaning solution) is not critical and may range from, preferably, about 0.1 to about 30 percent and, more preferably, from about 1 to about 5 percent by weight based on the weight of the alkali metal organosiliconate and aqueous solvent. If desired in the aqueous solution of alkali metal organosiliconate, up to about 5 percent by weight of the water may be replaced with water miscible inert organic solvents, for example, alcohols (such as ethanol, ethanol, n-propanol, isopropanol and ethylene glycol) and/or ketones such as acetone and methylethyl ketone). Although these may contribute to alkali metal organosiliconate solution stability, these are generally optional.

The one-step cleaner and water repellent of the present invention is preferably prepared in two separate but compatible solutions, which are then mixed just prior to application for one-step cleaning and water-repellent treatment. The first solution is a solution of alkali metal organosiliconate of the type discussed above. The second solution is a compatible alkaline-stable cleaning solution also as discussed above. The two solutions are preferably mixed just prior to application in any ratio and, more preferably, in about a 1:1 ratio by volume. The mixed solution is then applied in one step to the porous inorganic surface. For example, a consumer container having two separate chambers (one for the cleaning solution and another for the organosiliconate) can be used with a hand-held spray-type delivery device that mixes liquid from the two chambers in the hand-held device and delivers the mixed solution to the surface to be cleaned and treated with water repellent.

In accordance with the present invention, it has been found that the cleaning solution and alkali metal organosiliconate, when chosen in accordance with the present invention, are compatible with each other and provide a mixture which can be applied in one step and perform two functions simultaneously: (1) cleaning and (2) treatment for water repellency. The two-function mixture of the present invention has been found to be effective on porous inorganic surfaces. Such surfaces include those made of, for example, concrete, grout, mortar, brick, stucco, grouted tile, and asphaltic roof shingles and other building and household materials having similar surface properties. The method of application to such surfaces includes use of tools such as brush, roller, sprayer, sponge or rag. Liquid formula is applied and allowed to dry. The treated area is then rinsed with water.

The following examples provide illustration of the invention but are not intended to limit the scope of the invention hereto.

EXAMPLES

In the examples below, the following alkaline-stable cleaning solution was used throughout: a mixture of approximately 92.8% water, 3.5% sodium hypochlorite, 0.4% lauryl dimethyl amine oxide surfactant, 2.8% sodium chloride, 0.4% sodium hydroxide, and 0.1% fragrance (hereinafter referred to as the "Test Cleaning Formula").

Example A

A sample solution containing 50% Test Cleaning Formula (by weight) and 50% of a 6% active potassium methyl siliconate solution ( Dow Corning 777 resin) was made to determine if a siliconate was compatible with an alkaline-stable cleaning solution. The sample solution sat at ambient temperatures for four weeks with no visible change in stability (i.e., no visible phase separation no significant reduction in chlorine content, nor any change in color or viscosity).

Example B

Thereafter, several sample formulations were prepared of various siliconates and other silicone-type compounds to determine the feasibility of adding water repellent characteristics to an alkaline-stable cleaning solution in one application step as an additional benefit to the consumer. The formulations tested included the following:

B1. 90% Test Cleaning Formula+10% Dow Corning 772 (3% active sodium methyl siliconate)
B2. 80% Test Cleaning Formula+20% Dow Corning 772 (6% active sodium methyl siliconate)
B3. 90% Test Cleaning Formula+10% Wacker BS15 (3% active potassium methyl siliconate)
B4. 90% Test Cleaning Formula+10% Wacker BS20 (2% active potassium propyl siliconate)
B5. 95% Test Cleaning Formula+5% Dow Corning 531 (5% active aminofunctional silicone)
B6. 95% Test Cleaning Formula+5% Dow Corning 1-6184 (5% active silsesquioxane)

Several siliconates from various vendors were included in the study as well as one aminofunctional silicone (Ex. B5) and a new silsesquioxane resin available from Dow Corning. The silsesquioxane addition immediately failed to stay in solution indicating incompatibility with the Test Cleaning Solution. All siliconate additions showed good stability in the system. The addition of an aminofunctional silicone known commercially as "Dow Corning 531" (Ex. B5) showed compatibility only after stirring to emulsify the resin into the Test Cleaning Solution. Upon standing, this emulsion separated into two phases but shook back temporarily into a more uniform appearance for application purposes.

Example C

As stated above, the formulation containing silsesquioxane (Ex. B 6) was not stable and was eliminated from consideration as a stable component. The above formulations (Examples B1-B5) were used to treat triplicate samples of 5 cm concrete cubes (prepared by Masonry Test Block Co. of Saginaw. Mich.) according to ASTM standard D 1191. incorporated herein by reference. The untreated cubes were first immersed in water for up to 2 hours to determine their water absorption capacity at intervals of 0. 25, 0.5, 1.0 and 2.0 hours. The uptakes were recorded and the cubes were dried to constant weight. Triplicate samples were dipped for one minute in each formulation resulting in an average coverage rate of about 7.4 to 8.6 square meters per liter. The cubes dried for about 24 hours and were then rinsed in distilled water for one hour. The cubes were dried to constant weight and then immersed in the water. The amount of water absorbed was measured at the same time intervals as the untreated controls. The results were then calculated at percent absorption based on weight gain. The data isshown below.

| Percent Water Absorption On Concrete Cubes | | | | |
|---|---|---|---|---|
| | Immersion Times | | | |
| Formulation | 0.25 hr. | 0.5 hr. | 1.0 hr. | 2.0 hr. |
| Test Cleaning Sol'n | 1.6 | 2.7 | 4.4 | 6.4 |
| Ex. B1 | 0.4 | 0.6 | 1.1 | 2.0 |
| Ex. B2 | 0.2 | 0.2 | 0.4 | 0.4 |
| Ex. B3 | 0.4 | 0.6 | 0.9 | 1.3 |
| Ex. B4 | 0.3 | 0.3 | 0.5 | 0.6 |
| Ex. B5 | 2.0 | 3.5 | 5.5 | 6.7 |

The results show a clear reduction in the amount of water absorbed by cubes treated with the one-step cleaner and water repellent (Examples B1, B2, B3 and B4) versus a cleaner alone (Test Cleaning Sol'n). In addition, the results show that all of the organosiliconate-containing formulas performed significantly better than the aminofunctional silicone resin-containing formula. Thus, the present invention successfully combines effective cleaners with water-soluble siliconates to provide cleaning and water repellency in a single application treatment.

Example D

Studies similar to those in Example C above were conducted on mortar and grout. Mortar and grout materials were obtained at a local hardware store and unit samples were prepared according to the manufacturers' instructions. Again the samples were immersed in water for 2 hours to determine their water absorption capacity. The samples were dried to constant weight and dip-treated in each formula for one minute. They were dried for 24 hours and were rinsed in a constant-wash water bath for 24 hours. After drying to constant weight, they were immersed in water for 2 hours and weighed after completing the immersion. As with the concrete cubes of Example C, the results indicated a 60 percent reduction in water absorption in samples treated with formulations containing siliconate versus the Test Cleaning Solution alone. The samples treated with formulation Ex. B5 above (containing aminofunctional silicone) showed only a 30 percent improvement in water repellency. Again, the organosiliconate-containing formulas performed significantly better than the aminofunctional silicone-containing formula.

Example E

Studies were also conducted on wood to determine if any water repellency could be imparted to a porous wood surface during a cleaning step and the data indicated no measurable advantage could be gained on such surfaces.

Thus, a one-step cleaner and water repellent for porous inorganic surfaces has been provided. One skilled in the art will appreciate that the present invention can be practiced by other than the described embodiments, which are presented here for purposes of illustration and not of limitation, and that the present invention is limited only by the claims that follow.

What is claimed:

1. A one-step cleaner and water repellant composition for porous inorganic surfaces consisting essentially of:
    (a) an alkaline-stable cleaning composition consisting essentially of
        (i) at least one bleach selected from chlorine bleach and oxygen bleach;
        (ii) at least one surfactant; and
        (iii) at least one pH stabilizer, wherein the pH of said alkaline-stable cleaning solution is in the range of 10 to 14;
    (b) an alkali metal alkylsiliconate, and
    (c) water;

wherein the alkaline-stable cleaning composition and the alkali metal alkylsiliconate are compatible in water, and wherein said one-step cleaner and water repellant composition cleans said surface and imparts water repellency to said surface upon application to said surface.

2. The one-step cleaner and water repellant composition of claim 1 wherein said bleach is selected from the group consisting of sodium hypochlorite, calcium hypochlorite, sodium percarbonate, potassium peroxymonosulfate and mixtures thereof.

3. The one-step cleaner and water repellant composition of claim 1 wherein said pH stabilizer is selected from the group consisting of sodium hydroxide, potassium hydroxide, sodium silicate, sodium metasilicate and mixtures thereof.

4. The one-step cleaner and water repellant composition of claim 1 wherein the surfactant is lauryl dimethyl amine oxide.

5. The one-step cleaner and water repellant composition of claim 1 wherein the alkali metal alkylsiliconate has the general structure:

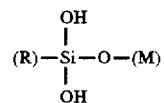

where R corresponds to a monovalent aliphatic alkyl radical and M is an alkali metal.

6. The one-step cleaner and water repellant composition of claim 5 wherein M is selected from the group consisting of sodium and potassium.

7. The one-step cleaner and water repellant composition of claim 1 wherein the bleach is sodium hypochlorite.

8. The one-step cleaner and water repellant composition of claim 7 wherein the surfactant is lauryl dimethyl amine oxide.

* * * * *